(12) United States Patent
Newman

(10) Patent No.: US 11,481,603 B1
(45) Date of Patent: Oct. 25, 2022

(54) SYSTEM FOR DEEP LEARNING USING KNOWLEDGE GRAPHS

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1008 days.

(21) Appl. No.: 15/983,666

(22) Filed: May 18, 2018

Related U.S. Application Data

(60) Provisional application No. 62/508,591, filed on May 19, 2017.

(51) Int. Cl.
  *G06N 3/04* (2006.01)
  *G06Q 40/02* (2012.01)
  *G06N 3/08* (2006.01)

(52) U.S. Cl.
  CPC ......... *G06N 3/0427* (2013.01); *G06N 3/0445* (2013.01); *G06N 3/08* (2013.01); *G06Q 40/025* (2013.01)

(58) Field of Classification Search
  CPC ...... G06N 3/0427; G06N 3/0445; G06N 3/08; G06Q 40/025
  See application file for complete search history.

(56) References Cited

U.S. PATENT DOCUMENTS

| | | | | |
|---|---|---|---|---|
| 5,465,321 A | * | 11/1995 | Smyth | G06F 11/2257 376/216 |
| 6,941,287 B1 | * | 9/2005 | Vaidyanathan | G06N 3/126 706/14 |
| 2004/0111370 A1 | * | 6/2004 | Saylors | G06Q 20/10 705/40 |
| 2006/0059073 A1 | * | 3/2006 | Walzak | G06Q 40/00 705/38 |
| 2011/0270779 A1 | * | 11/2011 | Showalter | G06Q 40/06 705/36 R |
| 2013/0138553 A1 | * | 5/2013 | Nikankin | G06Q 40/02 705/38 |
| 2013/0339293 A1 | * | 12/2013 | Witten | G06F 16/162 707/E17.005 |
| 2015/0046388 A1 | * | 2/2015 | Sheth | G06N 5/022 706/55 |

(Continued)

OTHER PUBLICATIONS

Handzic et al. (How Neural Networks Can Help Loan Officers to Make Better Informed Application Decisions, Jun. 2003, pp. 97-109) (Year: 2003).*

(Continued)

*Primary Examiner* — George Giroux
(74) *Attorney, Agent, or Firm* — Schwegman Lundberg & Woessner, P.A.

(57) ABSTRACT

A method may include receiving data from a computing device requesting approval of a loan application; accessing time-series data associated with the user from a knowledge graph; building a feature vector based on the accessed time-series data; inputting the feature vector into a machine learning model; receiving a response from the output from the machine learning mode, the output indicating a level of approval for the user with respect to the loan application; and transmitting a response to the request based on the level of approval.

18 Claims, 14 Drawing Sheets

(56) References Cited

U.S. PATENT DOCUMENTS

2017/0140041 A1* 5/2017 Dotan-Cohen ......... H04W 4/18
2017/0351762 A1* 12/2017 Lecue ............... G06F 16/24575

OTHER PUBLICATIONS

Simpson et al. (A Recurrent Neural Network Classifier for Improved Retrievals of Areal Extent of Snowcover, Oct. 2001, pp. 2135-2147) (Year: 2001).*

Grover, Aditya, "node2vec: Scalable Feature Learning for Networks", (Jul. 3, 2016), 10 pgs.

Ristoski, Peter, "RDF2Vec: RDF Graph Embeddings for Data Mining", (2016), 16 pgs.

* cited by examiner

SYSTEM FOR DEEP LEARNING USING KNOWLEDGE GRAPHS

TECHNICAL FIELD

Embodiments described herein generally relate to data structure manipulation and in particular, but without limitation, to semantic translation of data sets.

RELATED-APPLICATIONS

This patent application claims the benefit of priority, under 35 U.S.C. § 119(e), to U.S. Provisional Patent Application Ser. No. 62/508,591, titled "SYSTEM FOR DEEP LEARNING USING KNOWLEDGE GRAPHS," filed on May 19, 2017, which is incorporated by reference in its entirety.

This patent application relates to U.S. patent application Ser. No. 14/933,630, filed Nov. 5, 2015, titled "Semantic Processing of Customer Communications" and U.S. Patent Application No. 62/314,338, filed Mar. 28, 2016, both of which are hereby incorporated in their entirety.

BACKGROUND

Data may be stored in a variety of database paradigms. For example, a relational database may include one or more tables that are linked using a primary key (e.g, a column). A flat file database may be a character delineated file without explicit relationship links. Different management systems may be used to extract, transform, and load data (ETL) into a database. For example, a relational database management system may use structured query language (SQL) statements to retrieve data from the database.

Another type of database, a graph database may be used for related data. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
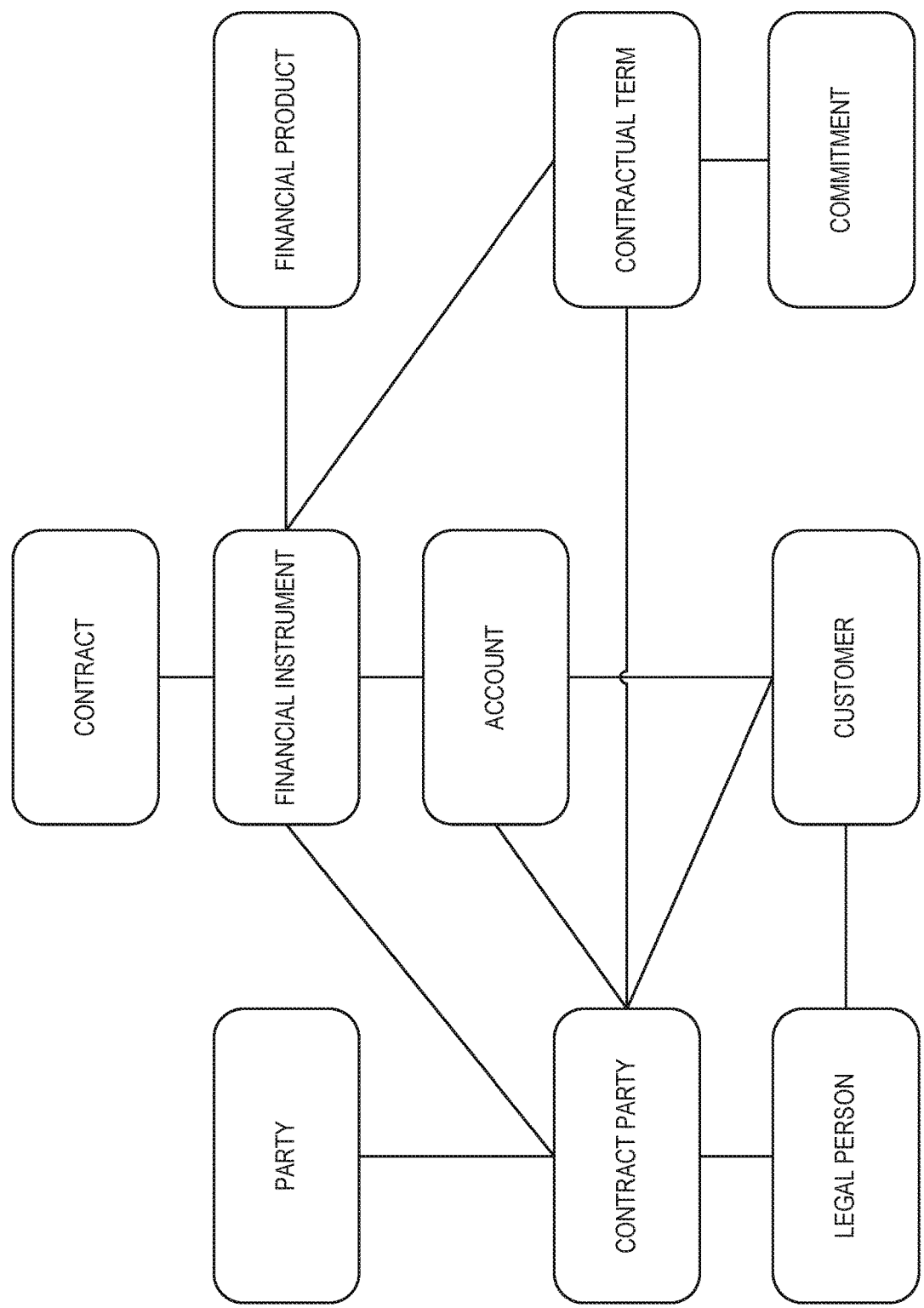
FIG. 1 is a diagram depicting relationships between objects that may be in a contract, according to various examples.

Many businesses store data in a relational database (RDB). RDBs may include a number of tables that store data relevant to a business. For example, a customer table may include columns for a unique customer identifier, customer name, customer address, etc. Another table may be for customer orders. This table, however, may forgo a column for customer name and instead use the customer identifier. This type of split between tables often reduces storage requirements and increases search efficiency. A "join" query may be used to retrieve all orders for a customer based on the customer identifier along with the address and name for the customer.

Relational databases are queried using structured query language (SQL) statements. The SQL statements, however, use a syntax based on column names and table names to retrieve the requested data. Consequently, there is no inherent semantic context to a search. For example, the customer identification column may be labeled "ID" or may be labeled "key." In other words, a query may not simply be made that reads, "show me all customer orders." Furthermore, even if a person knows the names of the columns and tables, the retrieved data may still be less than useful without a map indicating what the retrieved data represents e.g., the customer ordered part number 632, but no label is given to the part number. This is in part, because there may not be an agreed-upon semantic vocabulary when using a relational database.

An ontology may be used to help alleviate some of the problems with relational database. However, an ontology in of itself, may not permit efficient semantic searching of a relational database. A different type of database, such as a triplestore, may be used in conjunction with an ontology to permit semantic searching and storing of data. This disclosure describes various techniques to translate data from a relational database to a semantic database, such as a triplestore.

An ontology may be as a taxonomy of objects for a Oven field different fields may use different ontologies. The ontology may identify types (e.g., objects), properties, and interrelationships between the objects. In some examples, the definition of an ontology is described and stored as a schema at a network-accessible uniform resource identifier (URI).

As a simple example, consider a schema for a Person object. The schema may include a number of entries that define the properties of a Person object such as "Oven name," "height," "weight," etc., and the properties may also have expected types. Thus, the "height" property may have a quantitative type whereas "given name" may be text. The expected type of an object may be another object such as a property of "knows" having an expected type of Person. Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects.

As another example, consider FIG. 1 depicting relationships between objects that may be in a contract. Industry groups may promulgate schemas/ontologies for use by their members or for communicating with their members. For example, the Financial Industry Business Ontology (FIBO™) identifies numerous objects and their semantically defined relationships common in the financial industry—such as depicted in FIG. 1.

Figure 2:
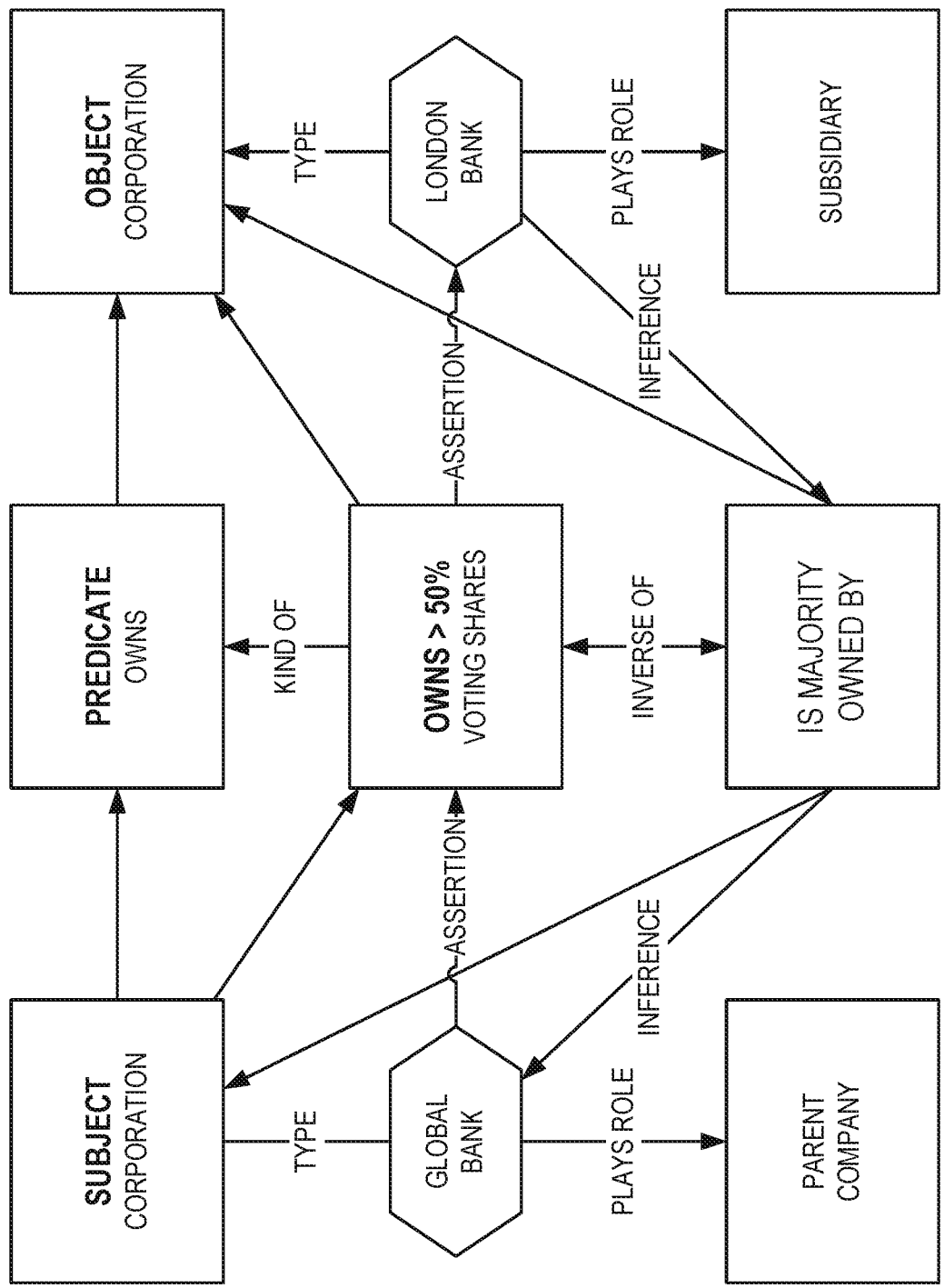
FIG. 2 is an illustration of an ontology, according to various examples.

FIG. 2 illustrates the concept of "Corporate Ownership" as used in a semantic ontology, according to an example. The example uses the S-P-O format discussed above. One flexibility of a semantic ontology is that data from any number of sources may be standardized and harmonized. Accordingly, once a data store (e.g, file system, relational database, NoSQL database, flat file database) is populated with enough semantically intact data, the data may be mined, stored, queried, audited, and validated. The data may originate in a number of forms such as unstructured data, a spreadsheet, a relational database, Extensible Markup Language (XML), JavaScript Object Notation, etc.

In some examples, a specific database, known as a triplestore (also sometimes referred to a resource description framework (RDF) database)), is used to store semantic data. Triples may be expressed using the World Wide Web Consortium's (W3C) RDF protocol. The W3C provides a Web Ontology Language (OWL) semantic web language. RDF/OWL ontologies may be used to associate a most likely terminology with parsed S-P-O communication in order to classify and type terms to a proper semantic meaning Once a basic term is associated with an element defined in an ontology, the term automatically inherits classes or abstractions that have been predefined in the ontology, which may introduce an additional meaning and context for the term.

Using a triplestore may permit customer knowledge graphs (CKGs) to be visualized by customer service representatives (among others). The visualization may permit the customer service representative to quickly determine a customer's situation without requiring multiple lookups in relational databases or tree-structures.

Figure 3:
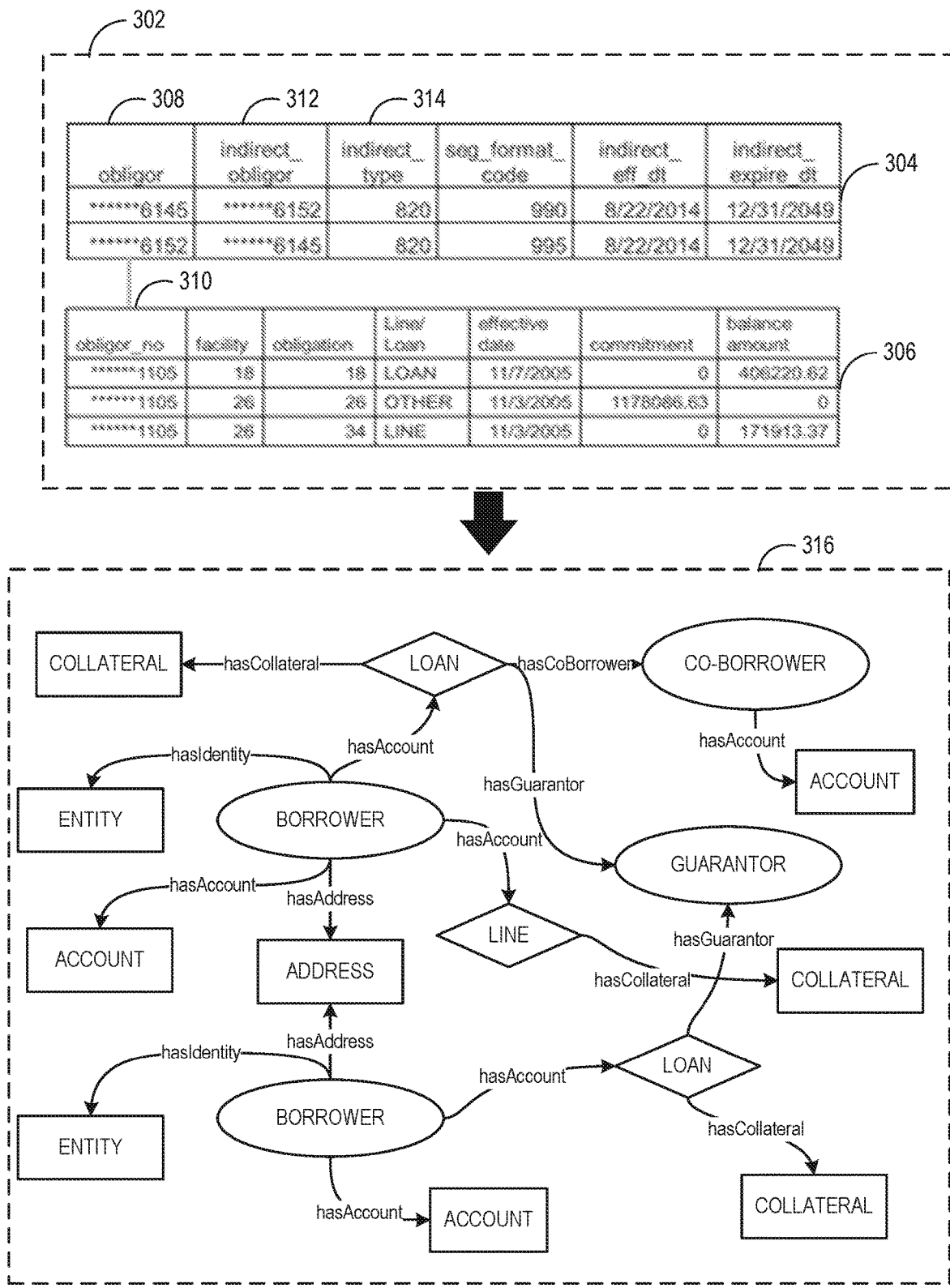
FIG. 3 illustrates an overview of a relational database table compared to an ontology relationship, according to various examples.

FIG. 3 illustrates an overview of a relational database table compared to an ontology relationship, according to various examples. The figure illustrates database 302 that includes table 304 and table 306. These tables in turn include various columns 308-314. Also illustrated is ontology visualization 316.

By way of an example, consider that the information stored in database 302 is financial data associated with loans and borrowers. The names of the columns and organization of the tables is illustrative and other organizations and labels may be used. It is hard to figure out much information by just looking at these tables. For example, there are obligors and indirect obligors that have indirect types. However, table 304 provides no indication of what indirect type 820 actually is. Consequently, although the information the tables is technically correct and may be queried as such, it is not semantically useful. Similarly, if a graph of the information contained in table 304 and table 306 was presented, the information would still be incomprehensible because one may not know what type 820 represented.

In contrast to the nature of information in a table format such as in database 302, ontology visualization 316 presents information in a more digestible format. The information contained in ontology visualization 316 is arranged around objects (e.g., borrowers, loans, guarantors, etc.) and not column labels.

Additionally, the relationships between data in tables 304 and 306 may make sense for a database schema. These relationships may not directly translate to a semantic ontology (as discussed further below). For example, column 308 may be a primary key for table 304. Accordingly, the information in table 304 may not be organized according to a loan number or identification. This means, that even if the two obligors in column 308 are actually on the same loan, the information is not stored that way. In fact, one can see that obligor 6145 is the indirect obligor for obligor 6152, and vice versa. Accordingly, if the semantic ontology uses a loan as a base object (an example of which is presented in FIG. 4), information in database 302 may not simply be queried and loaded into triplestore because the relationships in the database are different than the relationships in the semantic ontology.

Figure 4:
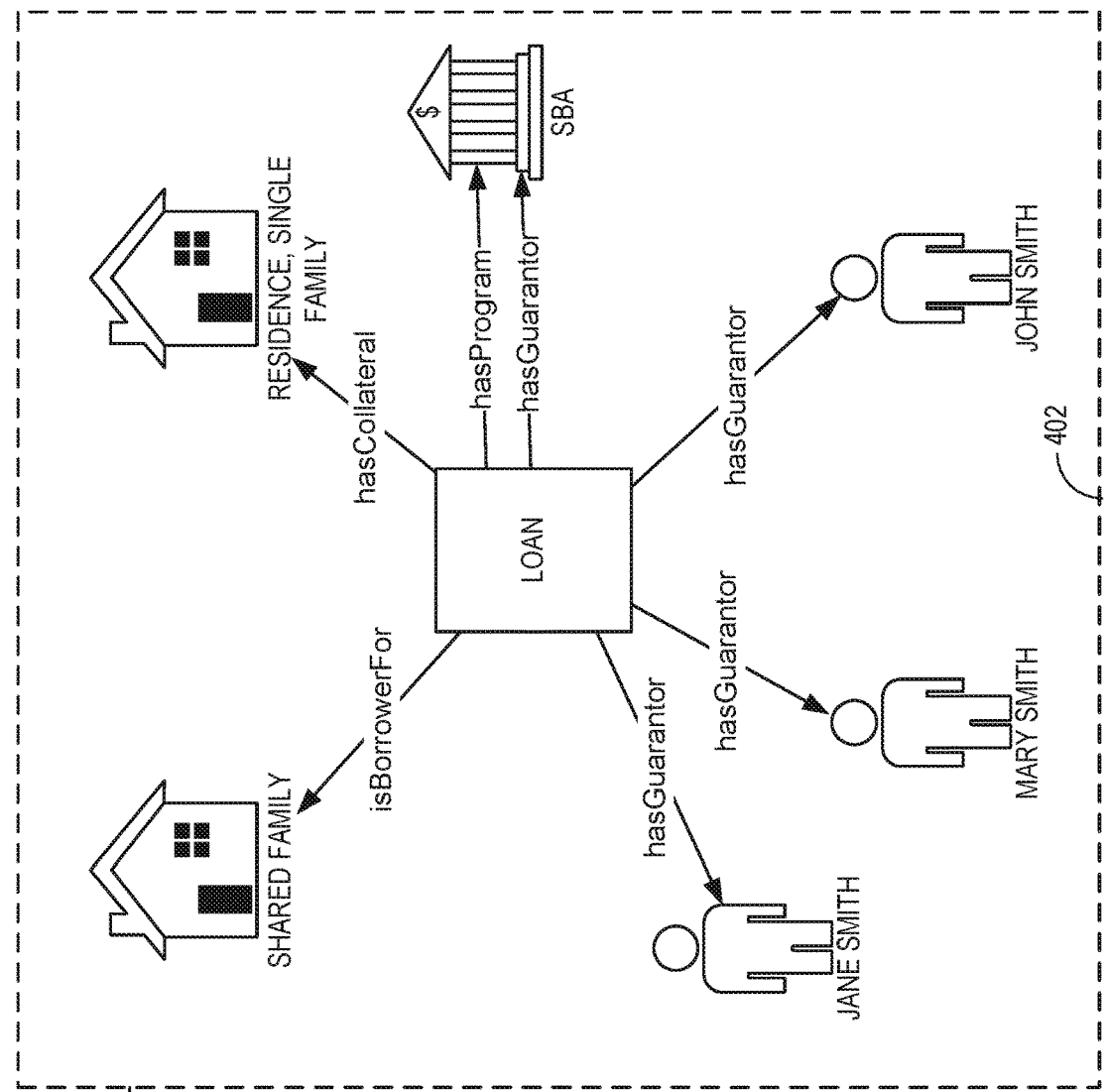
FIG. 4 illustrates a schematic of a process for presenting a knowledge graph, according to various examples.
Figure 4:
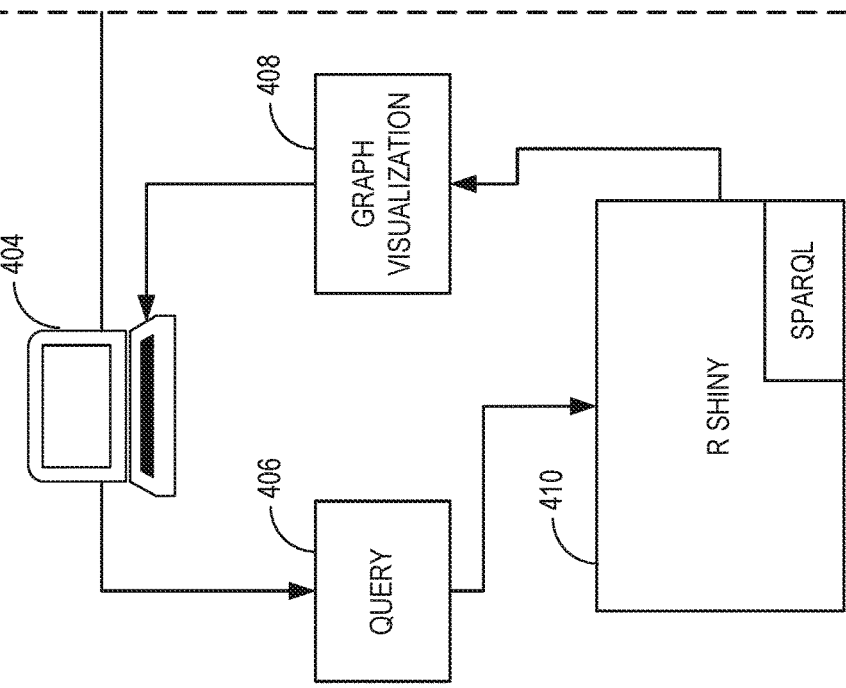

FIG. 4 illustrates a schematic of a process for presenting a knowledge graph, according to various examples. The example process includes computing device 404, and transmitting query 406 to server 410. Server 410 may execute query 406 and format the results of the query as graph visualization 408 (e.g., data representing nodes and edges of a graph). Knowledge graph 402 may be presented on computing device 404 as a result of receiving gap h visualization 408.

In knowledge graph 402, a hypothetical Smith family has a loan with guarantors of Jane Smith, Mary Smith, John Smith, and the Small Business Administration. Additionally, the loan is for a home and has a home as collateral. The information in FIG. 4 may be retrieved from a triplestore using SPAR % (a recursive acronym meaning SPARQL Protocol and RDF Query Language). Because a triplestore is a type of gap h database made up of nodes and edges, various graph visualization techniques may be used without departing from the scope of this disclosure. Additionally, image files may be used for object types in an ontology and used in the visualization of knowledge graph 402 (e.g., a house for residence object).

The components of FIG. 4 may communicate over a network. The network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g, Bluetooth®, Wi-Fi Direct), or other combinations or permutations of network protocols and network types. The network may include a singe local area network (LAN) or wide-area network (WAN), or combinations of LAN's or WAN's, such as the Internet.

Figure 5:
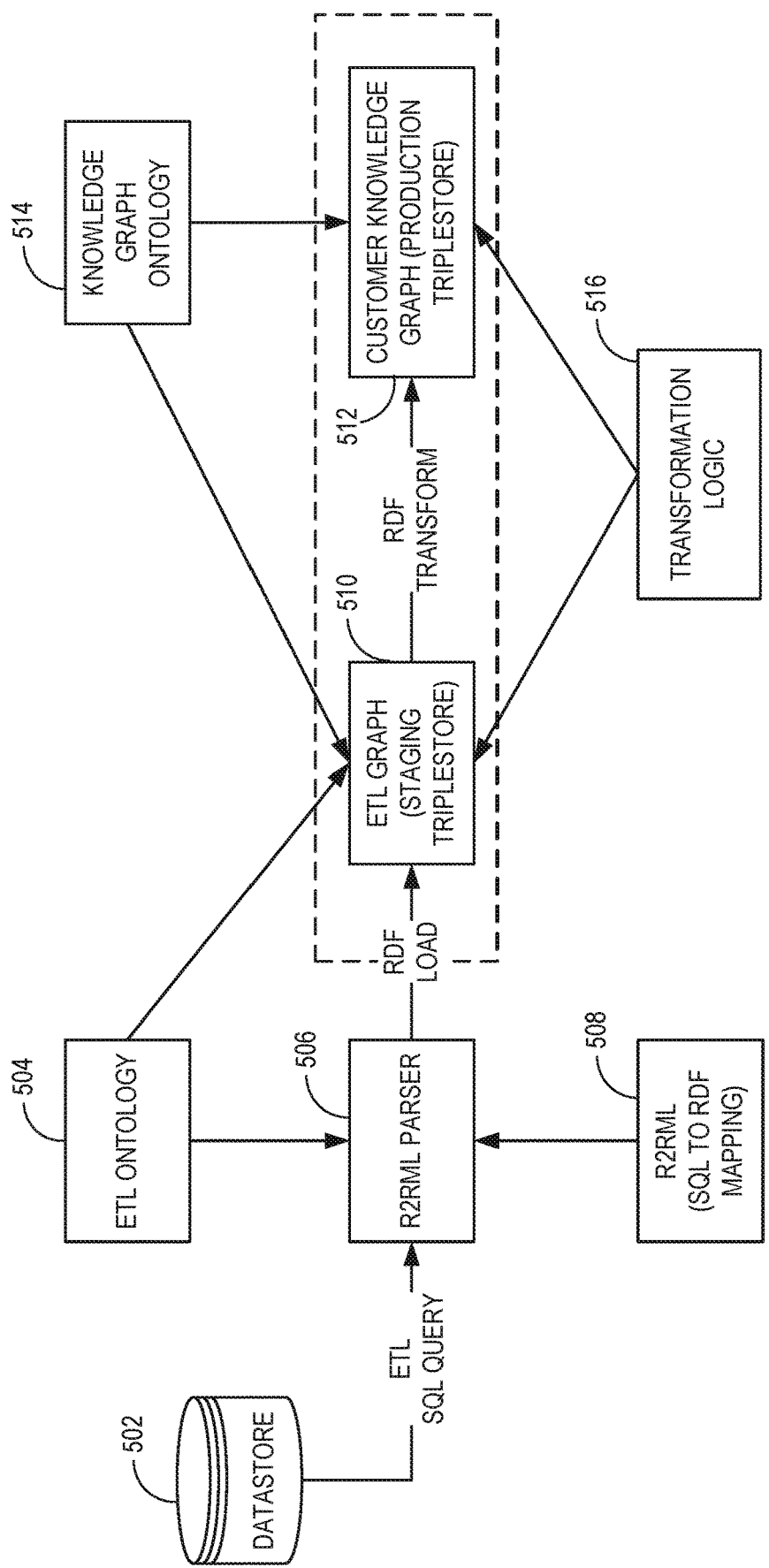
FIG. 5 illustrates a schematic of a process for translating data in a relational database into a knowledge graph, according to various examples.

FIG. 5 illustrates a schematic of a process for translating data in a relational database into a knowledge graph, according to various examples. The schematic includes relational datastore 502, Extract/Transform/Load (ETL) ontology 504, R2RML parser 506, R2RML mapping 508, ETL graph 510, customer knowledge graph 512, knowledge graph ontology 514, and transformation logic 516.

The components illustrated in FIG. 5 may be co-located or geographically disperse across one or more computing devices. The components may communicate over one or more networks (LAN, WAN, etc.). Program code for configuring a processor to perform the operations discussed with respect to FIG. 5 may be stored on a storage device. The program code may be loaded into system memory and executed by the processor to perform the operations. Performance may include the processor directing other devices (e.g., display devices, network devices) to perform functions.

A relational database (RDB) to RDF mapping proposed W3C standard exists called R2RML. One purpose of R2RML is to facilitate a map of existing relational data—as encapsulated in one or more databases—to the RDF data model. The input for an R2RML mapping is a logical table that may be a base table, a view, or a valid SQL query. The output of the R2RML is a mapping of the logical table to a RDF using a triple map. A triple map is anile that takes each row in one of the logical tables to an RDF triple. The rule may have two components, the subject map and a multiple predicate-object map, which may be made up of predicate map s and object maps. The triple for a given database row may be formulated by combining the subject map with a predicate map and an object map.

The proposed W3C documentation provides the following, slightly modified, example. Consider a database table EMP. The EMP table includes three columns: EMPNO, ENAME, JOB. A row of the EMP table is "7639:SMITH: CLERK." A triple map may for the EMP table may be:
@prefix rr: <http://www.w3.org/ns/r2rml#>.
@prefix ex: <http://example.com/ns#>.
<#TriplesMap1>
  rr: logicalTable [rr:tableName "EMP"];
  rr:subjectMap [
    rr: template
"http://data.example.com/employee/{EMPNO}";
    rr:class ex:Employee;
  ];
  rr predicateObjectMap [
    rr predicate ex:name;
    rr:objectMap [rr:column "ENAME"];
  ].
The output of the R2RML may be
<http://data.example.com/employee/7369> rdf:type ex:Employee.
<http://data.example.com/employee/7369> ex: name "SMITH".

Although R2RML may generate triples from a RDB, it may not be in a form useful for a CSR because the relationships defined in a RDB may be different than those in a customer knowledge graph (CKG). As described above, R2RML would generally use column names and the values of the columns to create the triples. In other words, the resulting ontology (e.g., ETL ontology 504) and R2RML map (e.g., R2RML mapping 508) generated based on a relational database (e.g., relational datastore 502) may be based on column identifiers. As an example, if R2RML parser is used on a table such as table 304, an obligor object of "*****6145" may have an "indirect_type" of "820." A CSR may not find this useful because the CSR may not know what an "indirect type" of 820 represents. Accordingly, a transformation of the resulting R2RML triples may be used to make the triples conform to an ontology of a CKG. A more detailed description of such a process is discussed next.

Relational datastore 502 may be one or more relational databases containing one or more tables. The databases may be stored on a single storage (or computing) device or distributed across multiple devices. The data may also be federated across multiple organizations. The data stored in the databases may be stored according to a database schema.

In an example, R2RML parser 506 takes data from relational datastore 502 an input and outputs ETL graph 510 (e.g., a staging triplestore). The input data may be the result of an SQL query submitted to relational datastore 502. Other inputs to R2RML parser 506 may be R2RML mapping 508 according to the R2RML specifications described above. R2RML parser 506 may also use ETL ontology 504, which may be based on the relationship and syntax of relational datastore 502, to generate the triples for ETL graph 510.

At this point, ETL graph 510 may contain a series of triples, but triples that do not conform to knowledge graph ontology 514. Transformation logic 516 may be used to transform triples in ETL graph 510 to triples in customer knowledge graph 512 (e.g., a production triplestore). Transformation logic 516 may be scripts written according to the SPARQL protocol. The scripts may contain instructions to create new triples, modify triples, or remove duplicated triples found in ETL graph 510.

A transitive map may be used as part of the SPARQL scripts to take objects according to ETL, ontology 504 to subjects according to knowledge graph ontology. Consider the 820 indirect obligor code discussed above. Transformation logic 516 may lookup code 820 in ETL ontology 504 and see that when the code 820 is used in the "indirect_type" column from table 304 in relationship to "indirect_obligor" it is for a class of "Guarantor." Accordingly, a triple for a guarantor object may be generated and stored in customer knowledge graph 512. ETL ontology 504 may include definitions (e.g., extensible markup language, table entries, etc.) in a tuple format (Column, Source Table, Class, [Property]). The tuple for the above example may be [indirect_obligor, ts_guarantor_data, Guarantor (indirect_type=820),]. In an example, the transitive map data (e.g., code 820 to guarantor) is stored in the SPARQL script. Consequently, ETL ontology 504 may not need to be queried to perform an RDF transform.

Figure 6:
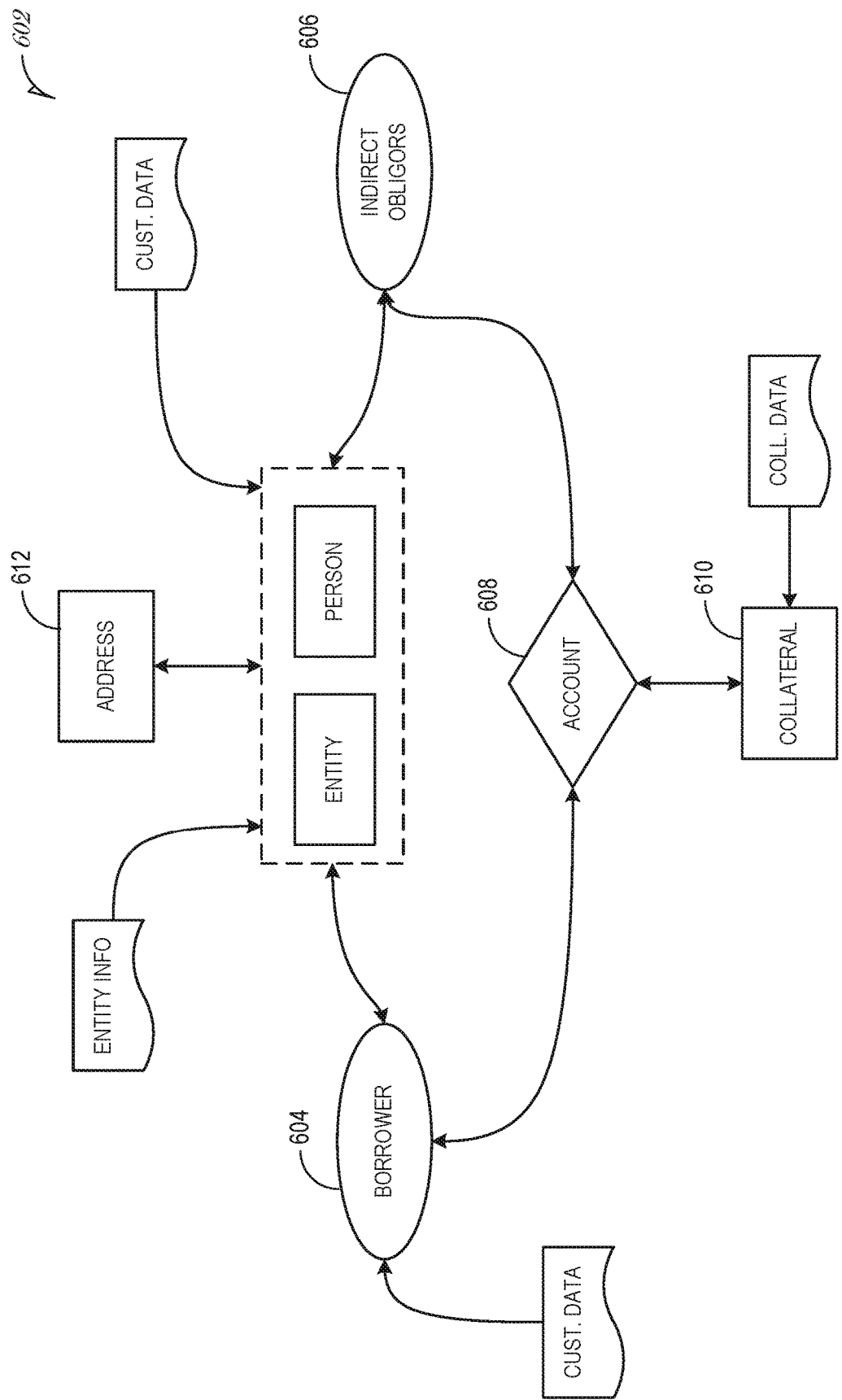
FIG. 6 illustrates a visualization of an RDF transform, according to various examples.

FIG. 6 illustrates a visualization 602 of an RDF transform, according to various examples. Visualization 602 includes semantic objects: borrower 604, indirect obligors 606, account 608, collateral 610, and address 612. The data stored in the semantic objects may ultimately be sourced from relational datastore 502, but in this instance, is most immediately sourced from triples in ETL graph 510. For example, "Cult Data" may be a triple that is the result of R2RML parser 506.

The creation of the semantic objects, and where to source the data for the objects, may be part of the SPARQL scripts. For example, a SPARQL script may first create a triple for borrower 604 after looking up an obligor type code from a triple in ETL graph 510. Next, account 608 may be created that is linked (e.g., related according to knowledge graph ontology 514) to a created indirect obligor object. After customer knowledge graph 512 has been created, ETL graph 510 may be discarded (e.g., deleted).

Machine Learning Models

Knowledge graphs may also be used as inputs to machine learning models. Types of machine learning models may include random forest, linear regression, logistic regression, decision trees, support vector machines, k-nearest neighbor, among others. Deep learning models (e.g., neural networks), a subset of machine learning models, may also be used. In many cases, machine learning models use numerical vectors as inputs—as opposed to qualitative metrics. Machine learning models have many use cases such as predicting an outcome given a set of inputs. For example, machine learning may be used to detect a previously identified virus on a computer or detect if a person appears in a picture.

Figure 7A:
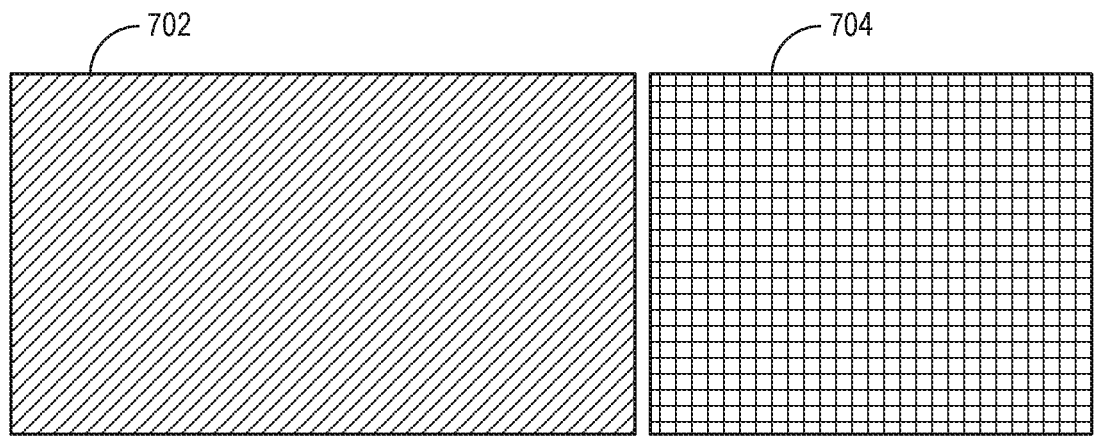
FIGS. 7A and 7B illustrate breakdowns of accepted applications and declined applications, according to various examples.
Figure 7B:
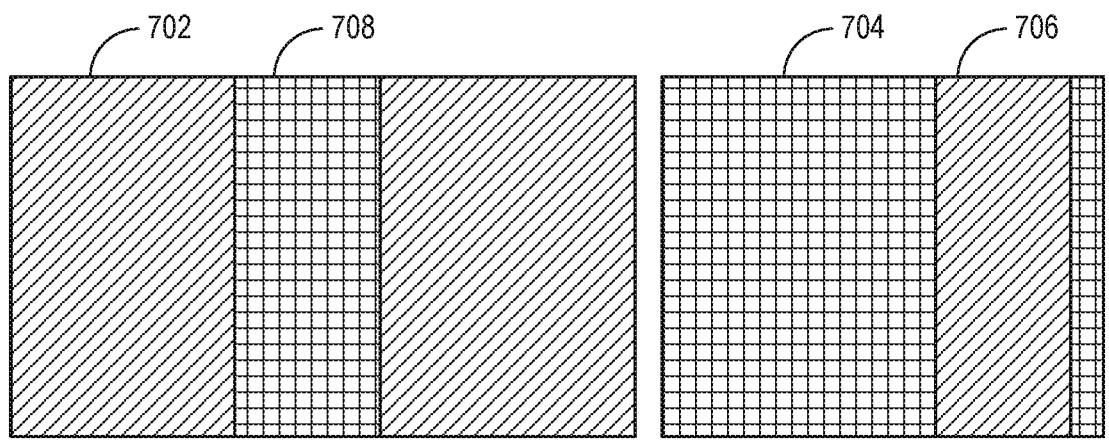

In some instances, machine learning may be used to help remove biases, conscious or unconscious, from human decision making. For example, FIG. 7A illustrates a breakdown of accepted applications 702 and declined applications 704. The applications may be loan applications, in an example, but other application types may also be used. Whether an individual loan application is accepted or declined may be determined by a human decision maker based on the available application data. Even when an algorithm is used for with various thresholds (e.g., loan-to-value), the thresholds are often set by a human decision maker. Furthermore, although every effort is made to remove biases, some decision makers may ultimately decline an application that should have been accepted (706) or accepted an application that should have been declined (708), as illustrated in FIG. 7B. Furthermore, even without biases, there are some loans that likely should have been accepted that were declined, and vice versa.

By using a machine learning model, the weighting of various factors may be done algorithmically, without human biases, based on past performance data of similar loan applications. An additional benefit of using a machine learning model is the ability to take into consideration factors, previously unknown to a human user, that are indicative of performance (e.g., whether the borrower defaulted) of a loan. Furthermore, a machine learning model may be continually improved in real-time or near rear-time (e.g., daily) based on the performance of newly accepted loans and previously rejected loans.

Figure 8:
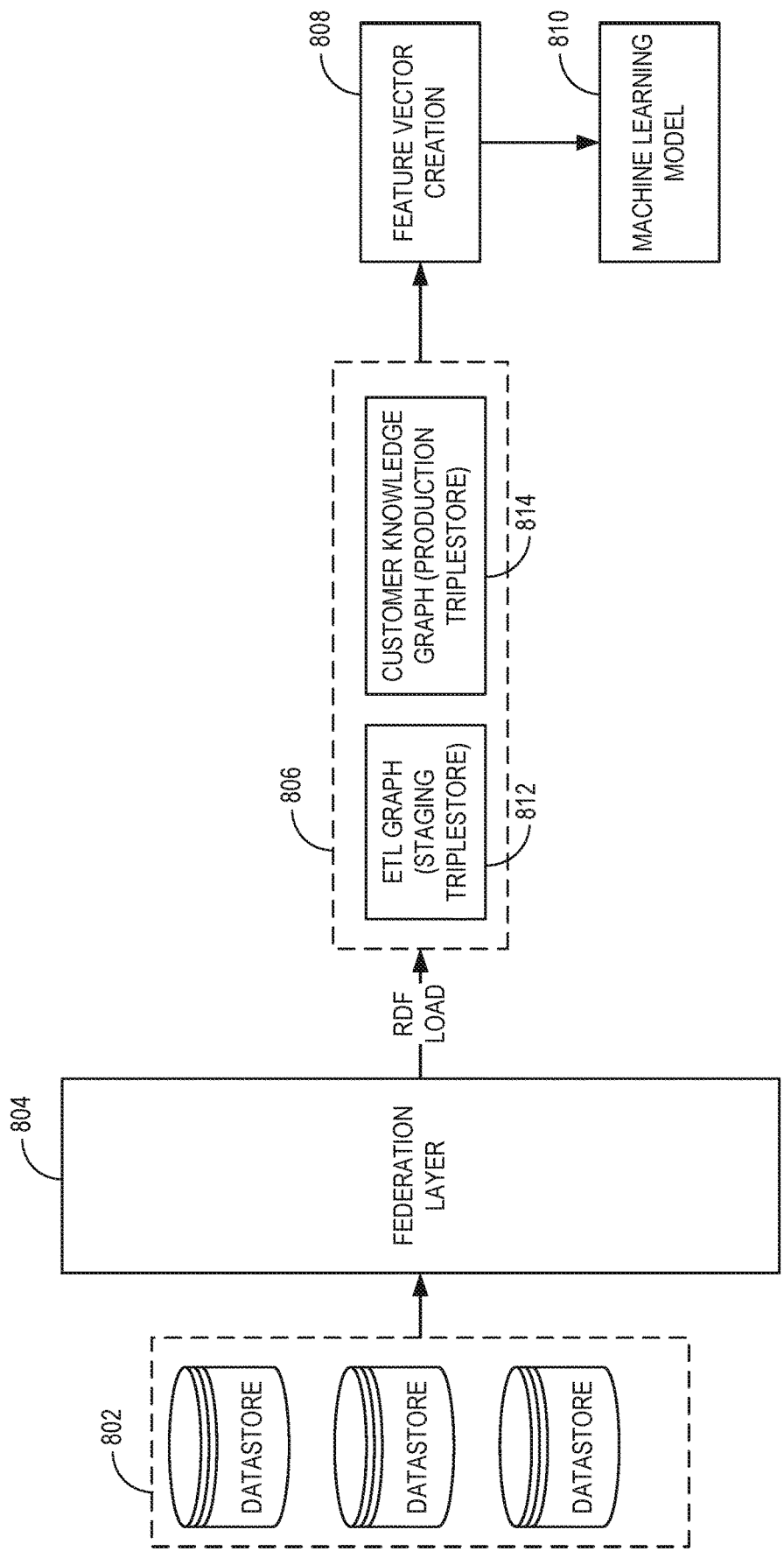
FIG. 8 illustrates a schematic overview of training a machine learning model, according to various examples.

FIG. 8 illustrates a schematic overview of training a machine learning model, according to various examples. The overview incudes data sources 802, federation layer 804, translation layer 806 (with staging graph 812 and customer knowledge graph 814), feature vector creation 808, and machine learning model 810.

Data sources 802 may store data on current or prospective customer of a financial institution. In an example, data sources 802 are relational databases of different management types (e.g., Oracle, IBM DB2, My SQL, etc.). Federation layer 804 may form a meta-database that maps the data from data sources 802 into a single virtual database that may be queried. In other word, the data from data sources 802 may not actually be copied into a new database, but the meta-database may be treated as if it was (e.g, it may be queried, etc.).

Translation layer 806 may use the data from data sources 802 to form staging graph 812 and ultimately customer knowledge graph 814 using a process such as described in FIG. 5. Customer knowledge graph 814 may include data from more than one customer in various examples.

Feature vector creation 808 may use data from customer knowledge graph 814 to form a series of feature vectors for training and testing machine learning model 810. A feature vector may include a series of numerical data points that describe an object. For example, a machine learning model used for classifying an animal based on length, height, and weight may have feature vector "[Length, Height, Weight]". A feature vector may be labeled or unlabeled. A labeled feature vector may indicate the animal and the numerical value of the features "Cat:22, 7, 8." An unlabeled feature vector may only include the numerical values of the features. Different machine learning models may be used depending on whether the feature vectors have been previously labeled—for example, supervised models use labeled feature vectors. Additionally, although many of the examples herein are discussed using a single-dimensional vector, multi-dimensional matrices and tensors may also be used as inputs to a machine learning model.

In various examples, a financial institution stores customer data that may be used to generate the feature vectors for validating, training, and testing machine learning model 810. Customer data may include account data (e.g., checking, savings, loans) and demographic data (e.g., age, residence, etc.). The account data may include daily balances, withdraw amounts, and deposits for the various accounts. Account data may also include bill pay information such as whether a bill or loan payment was made on-time. The customer data may also include financial health data such as a credit score, the number of credit accounts currently opened, length of accounts, etc. The customer data may be encrypted on a storage device.

In various examples, personally identifying information may be removed from the customer data before a training feature vector is generated. For example, a feature vector may not use actual account numbers or the actual address of a customer. Instead, the data may be generalized to a higher level—for example, a zip code or demographics of the customer.

A financial institution may also store loan data for current and past approved loans on one or more storage devices. The loan data may include performance data that indicates whether a borrower defaulted on the loan, paid on time every month, the percentage of the monthly payment made, went into forbearance, etc. A binary classification of performed or not-performed may be made for a loan after its term has expired based on whether the borrower successfully paid back all the principal and interest within the allotted repayment period. More granular classifications may be made as well such as partially performed if the principal and interest was paid back but the borrower was late on one or more payments or other combinations of performance data. A look-up table or weighted algorithm may be used to generate a quantitative indication of the performance (e.g., 1 is performed, 0 is not performed, 0.5 is partially performed). The loan data may also identify the borrower(s) of the loan.

A computing system may generate labeled feature vectors based on the stored loan data and customer data. The computing system may be part of the financial institution and may include more than one computing device. Machine-readable code may be executed by at least one processing device (e.g., computer processing unit, core, etc.) to perform the operations described herein.

To generate the feature vectors, the computing system may first obtain a set of completed loans (e.g., a loan whose term has ended). The number of loans obtained may be limited by time or quantity. For example, the computing system may query a storage device of the financial institution for all completed loans in the past y ear or the most recent 10,000 loans, or combinations thereof. For each loan in the set of completed loans, the computing system may obtain the identification of the borrower(s).

Then, the financial institution may retrieve some or all of customer data for each of the identified borrowers. The amount of customer data to retrieve may have been previously determined. For example, certain pieces of customer information may be more highly statistically correlated with performance of a loan. A threshold correlation value may be used to limit the amount of customer data retrieved. To determine the initial statistical correlations, a regression model or other statistical technique may be used based on available customer data and past loan performance data. Alternatively, all customer data may be used and fed into a deep learning model. In some examples, the account data may be retrieved querying a customer knowledge graph, such as customer knowledge graph 814 using a SPARQL query.

In some instance, historical account data may also be retrieved. The historical data may be a time-series of a single type of data or snap shots of the borrower's knowledge graph. At any given point in time, a borrower's knowledge graph may have different RDF triples. As an illustration, consider that a borrower may open and close various credit card accounts. Thus, a snapshot of the borrower's knowledge graph one month may include an RDF triple for the credit card account indicating "open" whereas another month the RDF may indicate "closed" for the same account. Alternatively, or additionally, some historical customer data may be stored in a relational database of the financial institution. For example, daily account balances accounts for the borrower may be stored.

The feature vectors may be limited to inherently quantitative data of the borrower (e.g., account balances, number of accounts, etc.). If time-series data (e.g., historical account data) of the borrower is used, the feature vectors may be multi-dimensional. For example, columns of the feature vector may be the various inputs (e.g., accounts) and the rows may be snapshots of the balances of the accounts over time.

However, in some instances, the feature vectors may also be based on RDF triples, which include at least one word. An RDF triple may be translated into a quantitate value in multi-dimensional space using various techniques (e.g., RDF2Vec). Accordingly, a feature vector representation of the various entities in a customer knowledge graph may be generated. The RDF triple may include some quantitative data as well. For example, the balance of an account may be stored as property of a checking account object a customer knowledge graph.

A label may be assigned to a feature vector regardless of the method of generating the feature vector. The label may be a quantitative representation of the performance of the completed loan by the borrower as discussed in more detail above. Consequently, for each borrower of a loan a feature vector may be in the form of [label: $f_1, f_2, \ldots f_n$] where each 'f' represents a quantitative value retrieved from a relational database or converted from a customer knowledge graph. The feature vector may also include time-series data of each resulting in a tensor, but a non-time-series feature vector is illustrated for simplicity. The set of resulting feature vectors may be split into validating, training and testing sets according to known techniques.

The training set of feature vectors may be fed in a machine learning model to train the model. One type of machine learning model is a neural network. The basic architecture of a neural network includes one or more layers of interconnected nodes beginning with one or more input layers, one or more hidden layers and one or more output layers. The number of layers and the number of nodes per layer may be set as part of the neural network architecture. The settings (e.g., number of layers, connections between nodes of layers, etc.) for the architecture of a neural network are also often referred to as hyperparameters.

A node's value may be a function (sometimes referred to as an activation or transfer function) of the weighted sums of one or more nodes' values in a previous layer. An example activation function may be a non-linear function such as the logistic function:

$$(x) = \frac{1}{1+e^{-x}}.$$

This value, in turn, may be used as part of an input of a node in the next layer again, with a weight applied to it. The weights may have initial values that are changed based on the training set that is run through the neural network, referred to as backpropagation. The activation function may be one of the hyperparameters, as well as the rate of change of the value. The above description is merely provided as an illustration of some of the concepts of a feedforward neural network, and other parameters and more sophisticated neural networks may also be used (e.g., recurrent neural networks, ensemble networks, etc.).

In an example, the input nodes may correspond to each feature included from the generated feature vectors described above. Accordingly, there may be an input node representing each entity in an ontology of customer knowledge graph 814. Some of the input nodes may also correspond to general quantitate values of the borrower such as overall debt level, asset level, etc. When used as a binary classifier, the neural network may include a single output node. The output node may represent the loan performance. As each training feature vector is passed through the neural network, the coefficients of nodes in the hidden layers may get updated. After machine learning model 810 has been trained, it may be used to make an initial decision of whether or not to approve a loan application.

Figure 9:
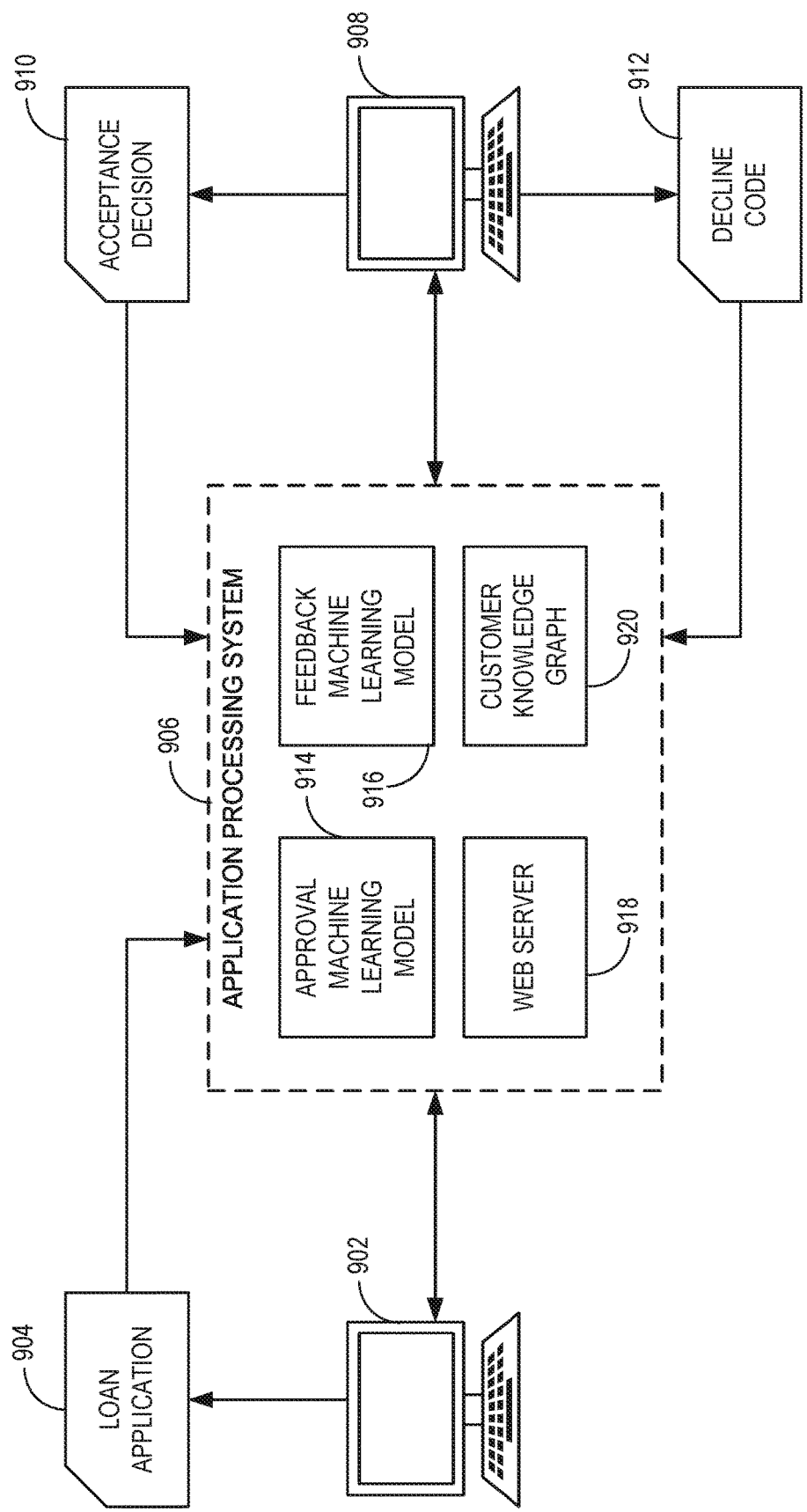
FIG. 9 illustrates a system for processing a loan application, according to various examples.

FIG. 9 illustrates an example system for processing a loan application. The example system includes user device 902, loan application 904, application processing system 906, computing device 908, acceptance decision 910, decline code 912, approval machine learning model 914, feedback machine learning model 916, web server 918, customer knowledge graph 920.

A potential or current customer may submit loan application 904 via a webpage provided by web server 918 of application processing system 906. Application processing system 906 shows a number of components as part of a single entity, but the component may be distributed, geographically as well as logically, across multiple entities. The execution of the components may also be distributed across multiple entities. Furthermore, the functionality described with respect to each component may be performed by other components of application processing system 906, in various example (e.g., more or fewer components may be used). At least one processor (not shown) of application processing system 906 may execute non-transitory machine-readable instructions to perform the functionality ascribed to application processing system 906.

A completed loan application 904 may include borrower(s) identification (e.g., name, security number, etc.) The loan application may also identify accounts held by the borrower(s) including other loans, interest rates of the loans, payment terms, etc. A user may, for example, use input forms of a webpage to enter in the information using user device 902. A web browser of user device 902 may format an HTTP POST command with filled in input forms as the pay load back to web server 918. In some examples, loan application 904 does not include all the information (e.g., all accounts), but the completed information may be used to gather missing information.

Application processing system 906 may generate an input feature vector based information based on loan application 904 that include a series of values that correspond to the input features of approval machine learning model 914. For example, when approval machine learning model 914 is configured as a neural network, an input vector may include a value for each input node to the neural network. In some instances, the values in the input vector may be retrieved from the loan application 904 directly, from customer knowledge graph 814, from a relational dataset of the financial institution, external sources using APIs, or combination thereof. For example, the borrow identification may be used as input criterion to a SPARQL query for customer knowledge graph 814.

Next, application processing system 906 may input the generated feature vector into approval machine learning model 914. In an example, approval machine learning model 914 is a binary classifier trained using feature vectors as discussed above with respect to machine learning model 810. The output of approval machine learning model 914 may be a value between 0 and 1 indicating the approval status. A value of may represent a high degree of confidence that loan application 904 show be denied and a value of 1 representing a high degree of confidence that loan application 904 should be denied.

A threshold confidence level may be stored by application processing system 906. A loan application may be classified as approved if the output of approval machine learning model 914 is at or above the threshold confidence level. If approved, the decision may be transmitted back to user device 902 indicating the approval.

When the output of approval machine learning model 914 is below the threshold confidence level, a denial may be transmitted back to user device 902. However, in some instances, it may not be sufficient to rely on approval machine learning model 914 for the denial additional reasoning may be needed. In such instances, an additional process may be used.

Computing device 908 may be a device used by an employee or third-p arty associated (referred to as a system user) with the managing entity (e.g., a financial institution) of application processing system 906. In some examples, computing device 908 is part of application processing system 906. Acceptance decision 910 may be an electronic message that indicate the output value of approval machine learning model 914 for loan application 904. Computing device 908 may access acceptance decision 910 via a webpage or dedicated application running on computing device 908.

A user interface on computing device 908 may present the acceptance decision 910 along with data associated with loan application 904. The associated data may include the information input by the user as well as information retrieved from customer knowledge graph 814. In some examples, a graphical representation (e.g., FIG. 4) of customer knowledge graph 814 is presented allowing the system user to quickly see a visual representation of the loan applicant's financial situation.

An input form may be presented on the user interface for the system user to enter in a reason for not approving loan application 904. The reason may include a selection of one or more decline codes (alphanumeric, etc.). The reason may also include a qualitative assessment of the denial. The decline codes may be a set of predefined codes store at application processing system 906. After receiving input from the system user, decline code(s) 912 may be transmitted back to application processing system 906. In some examples, a message may be transmitted to user device 902 indicating the reasoning behind a decline based on decline code 912.

It may be advantageous to remove the need for review by a system user. To this end, a second machine learning model such as feedback machine learning model 916, may be trained to determine decline code(s). Feedback machine learning model 916 may a neural network that includes output nodes for each decline code. In some configurations, feedback machine learning model 916 maintains an output node for an overall loan approval value whereas in others it is omitted. In some example, feedback machine learning model 916 may be trained using feature vectors from previously declined loan applications.

A training feature vector may be generated for feedback machine learning model 916 based on the information from loan application 904 as well as queried information and received decline code 912. The information contained in the input feature vector for approval machine learning model 914 may be reused to the form the basis of the training feature vector. The training feature vector may be labeled based on the received decline code 912. Also, the training feature vector may have more than one label when more than one decline code is received. The label for the overall loan approval node, if present, may be '0' indicating a label of not approved.

Over time as more training feature vectors are used based on system user data, feedback machine learning model 916 may be become more accurate with determining one or more decline codes for a declined loan application. For a given feature vector, the output nodes of feedback machine learning model 916 may indicate one or more appropriate decline codes. The value of each respective output node may indicate the appropriateness of a decline code for an application.

For example, consider that there are 10 decline codes, and the first output node corresponds to the first decline code, the second node corresponds to the second decline code, and so forth. The first output node may have a value of 0.26, the second output node a value of 0.4, and the third output node a value of 0.8 for a given input feature vector. A decline code confidence threshold may be set to determine which decline codes are ultimately used. For example, if a 0.5 threshold is set, then the decline code corresponding to output node three may be used in conjunction with declining a loan application.

After an initial training period (e.g., X loans, X days, etc.), feedback machine learning model 916 may start to be used instead of, or in conjunction with, decline codes from computing device 908. For example, the feature vector generated based on loan application 904 may fed into both approval machine learning model 914 and feedback machine learning model 916. The outputs from both models may be transmitted to a system user at computing device 908. The system user may confirm of modify the decline codes and transmit a response back to application processing system 906. Feedback machine learning model 916 may be up dated (e.g., trained further) based on the response from computing device 908. In an example, feedback machine learning model 916 is updated per response or in batch mode (e.g., weekly). When feedback machine learning model 916 reaches a certain level of accuracy (e.g., 99.9%) such that a system user does not change the decline codes, application processing system 906 may stop transmitting requests for additional input from the system user.

The above examples describe training machine learning models using actual loan performance data already available to a financial institution. Consequently, there was no need to estimate or guess the performance of the loan. As discussed in FIG. 7B there may have been loans that should have been accepted, but were declined. Machine learning models may also be trained using inferred performance data for those loans that were never accepted in the first place.

Figure 10:
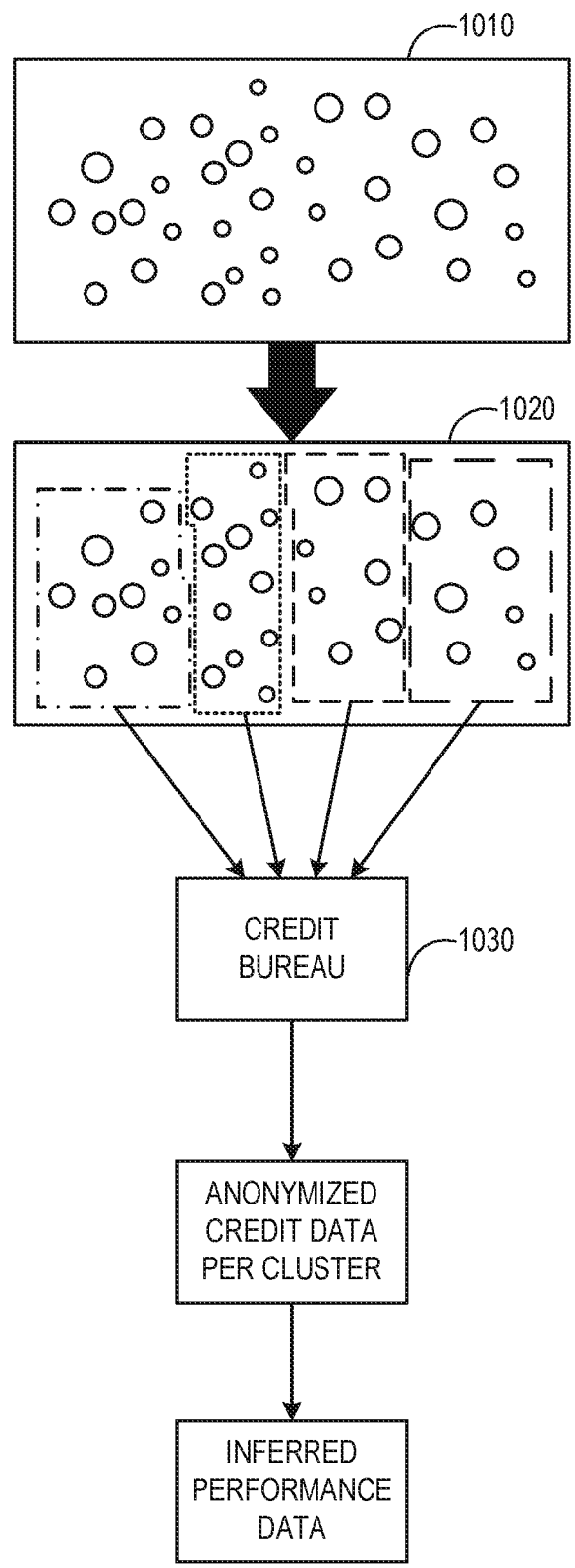
FIG. 10 illustrates retrieving inferred performance data from previously declined loans, according to various examples.
Figure 11:
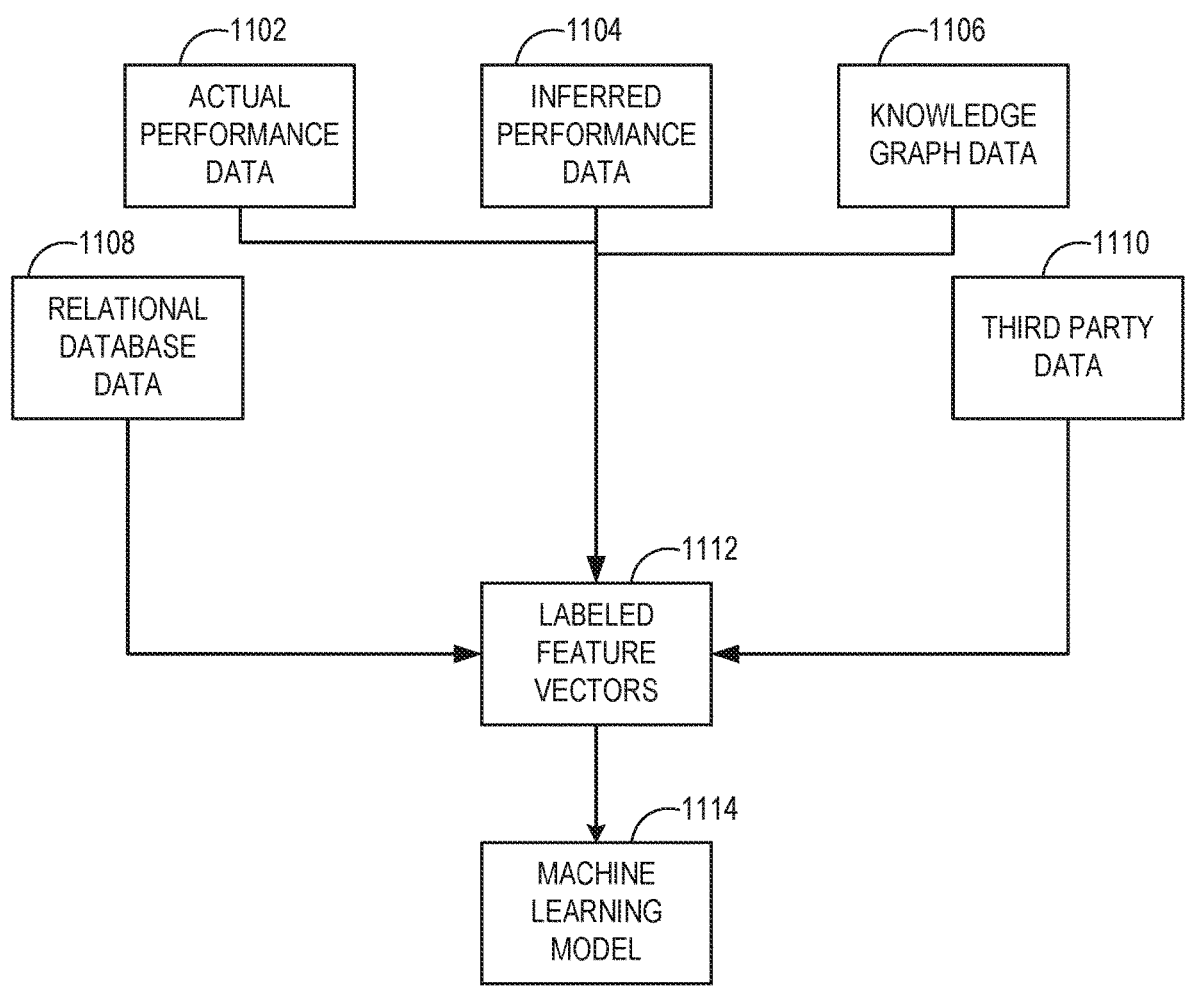
FIG. 11 illustrates a schematic overview of inputs to train a machine learning mode, according to various examples, according to various examples.

FIG. 10 illustrates retrieving inferred performance data from previously declined loans, according to various examples. FIG. 10 includes declined loans 1010, clustered loans 1020, credit bureau 1030. Although not illustrated, performance of clustering and other functional aspects of FIG. 10, is discussed as being performed by application processing system 906. In some examples, one or more separate system may be used.

Declined loans 1010 may represent loans that were previously declined by a financial institution and have associated loan application data. The loan application data may include borrower identification, current address, currents accounts, number of accounts, average interest rate on existing loans, income, etc. Accordingly, any particular loan of declined loans 1010 may be classified according to a number of characteristics according to the loan application data.

A clustering algorithm executing on application processing system 906 may be used on the set of declined loans 1010 to generate a plurality of clusters. Example clustering algorithms include hierarchical and k-means. Generally, clustering algorithms place each item (e.g., a declined loan) in multi-dimensional space according to a set of characteristics (e.g., information in the loan application). Then, the similarity between any two items may be determined according to the distance (e.g., Euclidean, Cosine, etc.) between the items. The number of desired clusters may set ahead of time or a stopping condition may be used. The results of the clustering algorithm may be clustered loans 1020.

Application processing system 906 may then infer the performance of a loan—assuming the loan had been accepted and not declined—of each cluster. Performance may be informed using data received from credit bureau 1030, existing customer data, or both. For example, a credit bureau 1030 may transmit data to application processing system 906 indicating past performance data for members of an individual cluster. The past performance data may include average balances, number of accounts, balances by month on the accounts, etc. The past performance data received from credit bureau 1030 may be anonymized such that personally identifiable information has been removed.

Given averages of the past performance data, a system user may be able to estimate whether or not a loan application would have performed or not-performed for an applicant with like characteristics of a particular cluster. In some examples, the past performance data is of a similar scope and character as used in a feature vector for training approval machine learning model 914. Consequently, additional labeled feature vectors may be generated for training approval machine learning model 914.

Additionally, some of the declined applicants may also be an existing customer of a financial institution. So, past performance data may be inferred by examining how the applicant has performed with past loans or other products that are stored in customer data for a financial institution. Labeled feature vectors may be generated using the customer data in a similar manner as those in the clusters. In some examples, applicants that are existing customers of the financial institution are not used by the clustering algorithm.

NG. 11 illustrates a schematic overview of inputs to train a machine learning mode, according to various examples. The figure includes potential inputs of actual performance data 1102, inferred performance data 1104, knowledge graph data 1106, relational database data 1108, and third party data 1110. A machine learning model may be trained using all or a subset of the inputs. The figure further displays the inputs being formed into labeled feature vectors 1112, which are in turn used to train machine learning model 1114.

Data from the input sources may need to be manipulated before a feature vector is generated. Manipulations may include, standardization, validation, transformation, semantic inferences, normalization, and pruning across the different input data sources. For example, different data sources may store names in different formats (e.g., last name, first name vs first name, last name, etc.) Additionally, personal identifying information may be obfuscated using hashing or other techniques.

Then feature vectors may be formed from the manipulated data in accordance with the configuration of machine learning model 1114. Forming a feature vector may include transforming semantic graph data into a numerical vector. Transforming words from a graph into a vector may include encoding the words into the vector format.

Word2vec is an example technique that generates vector representations of a words. The number of features for each vectorized word may be configurable. This technique first forms a "one-hot" or 1-of-N encoding from a vocabulary of words, which may be based on a corpus of text. So, if the vocabulary includes [king queen, man, women], king may be encoded in a vector of [1, 0, 0, 0], queen as [0, 1, 0, 0] and so forth. Each vector may only have a single '1' and the rest '0's. Once each word has a vector representation, mathematical calculations may be made such as v(King)−v(Man)+v(Woman) may approximately equal v(Queen).

A neural network may be used to generate a vector, of N features, for each of the words in the vocabulary. The neural network may include a single fully connected hidden layer with N×V nodes. The output layer may be the same size as the input layer—four nodes continuing the example above. A matrix of V×N may connect the input layer to the hidden layer and a matrix N×V connections may connect the nodes of the hidden layer to the output layer. The SoftMax function may be used to translate the output layer into a series of probabilities that add up to 1 based on the corpus of text and given vocabulary. The neural network may be trained by using different context-target word pairs from the corpus.

A related process (RDF2Vec) may be used to generate vector representations of concepts within a semantic graph, such as knowledge graph data 1106. RDF2Vec may convert an RDF graph into a sequence of entities and relations—essentially, a series of sentences. The conversion may be done using graph walks or graph kernels of a chosen depth. A neural network may be trained with each entity and relation being represented as an N-dimensional numerical vector using an approach like word2Vec. As with word2Vec, semantically similar concepts may appear close in Euclidean space.

Figure 12:
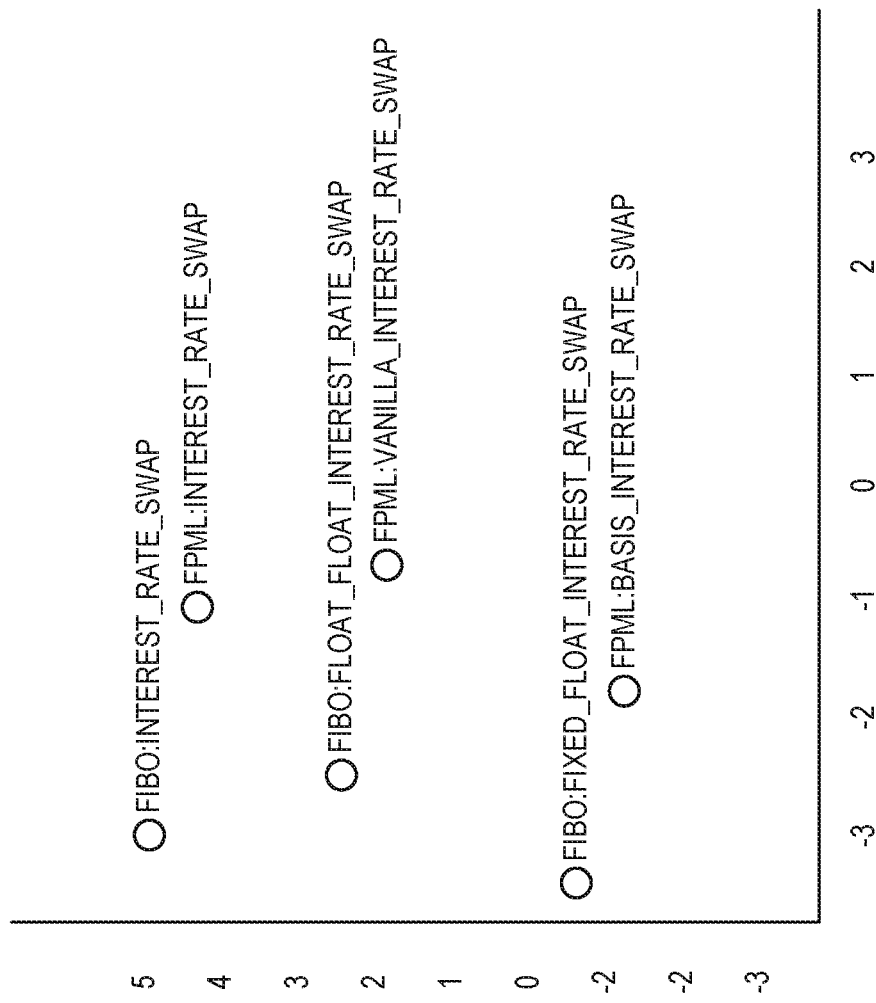
FIG. 12 illustrates a two-dimensional projection of concepts in an ontology, according to various examples.

FIG. 12 illustrates a two-dimensional projection of concepts in an ontology, according to various examples. FIG. 12 includes concepts 1202, 1204, and 1206 that may be concepts of a first ontology and concepts 1208, 1210, and 1212 as concepts of a second ontology. The displayed concepts may be a simulation of a vectorized ontology via principal component analysis using RDF2Vec. As can be see, the distance between the displayed concepts of the first ontology are is similar to the distance between the displayed concepts of the 1208, 110, and 1212, however, the concepts are just offset from each other. Accordingly, an inference can be made that the relationship between 1202 and 1204 is similar to 1208 and 1210.

Having a vectorized ontology facilitates many use cases. For example, consider that the vector representation of the concepts in FIBO have been generated (FIBO2Vec). The representations may be formed by feeding FIBO concepts into a two-layer neural language model to generate sequence vectors of neural embeddings that can provide unique digital footprints of complex composite concepts.

Deep learning models may leverage FIBO standards and financial knowledge to recognize related concepts in documents, validate data, determine incomplete data structures, and classify data. A further use case may be training deep learning algorithms to detect whether reports conform to regulatory requirements by training against report exemplars coded using FIBO elements.

Also, FIBO2Vec may help determine whether the ingestion of new concepts aligns within the existing semantic scaffolding as part of automated ontology learning. Additionally, vector arithmetic may be performed using the concepts in FIBO for machine learning. A vectorized ontology may also allow deep learning to replace slower semantic reasoners and manually coded SPARQL queries, in some examples.

Consider the situation in which a user enters unstructured text into an input box of a website of a financial institution. The unstructured text may vectorized according to FIBO2Vec. Then, the vectorized text may be fed into a trained machine learning model to determine which concepts of FIBO are likely implicated (e.g., looking at the output nodes of the machine learning model). This may include identification of one or more financial institution products of services related to the text. The identifications may be given to a customer service representative to help assist the user more efficiently.

Figure 13:
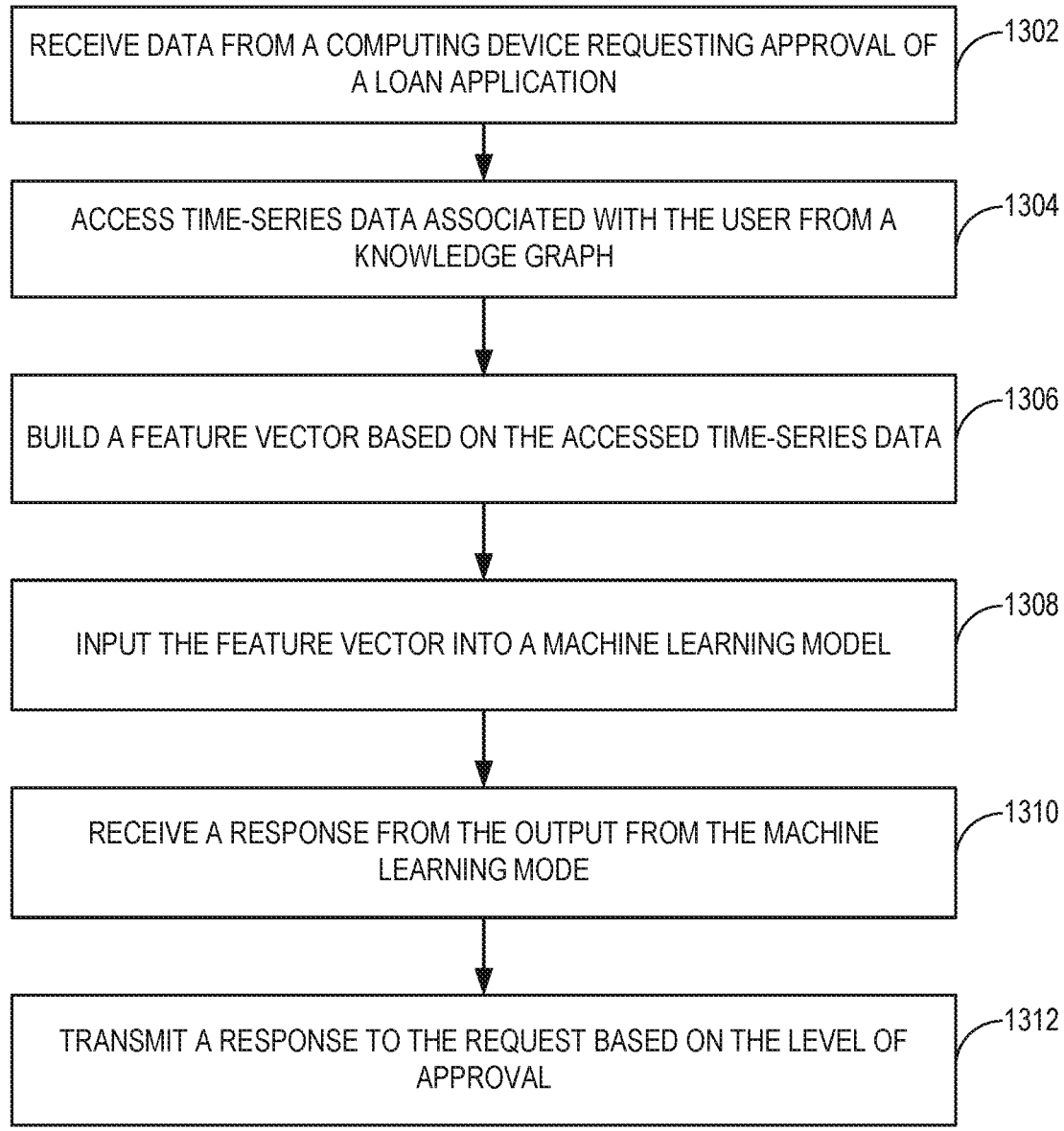
FIG. 13 illustrates a flowchart of a method 1300, according to various examples
Figure 14:
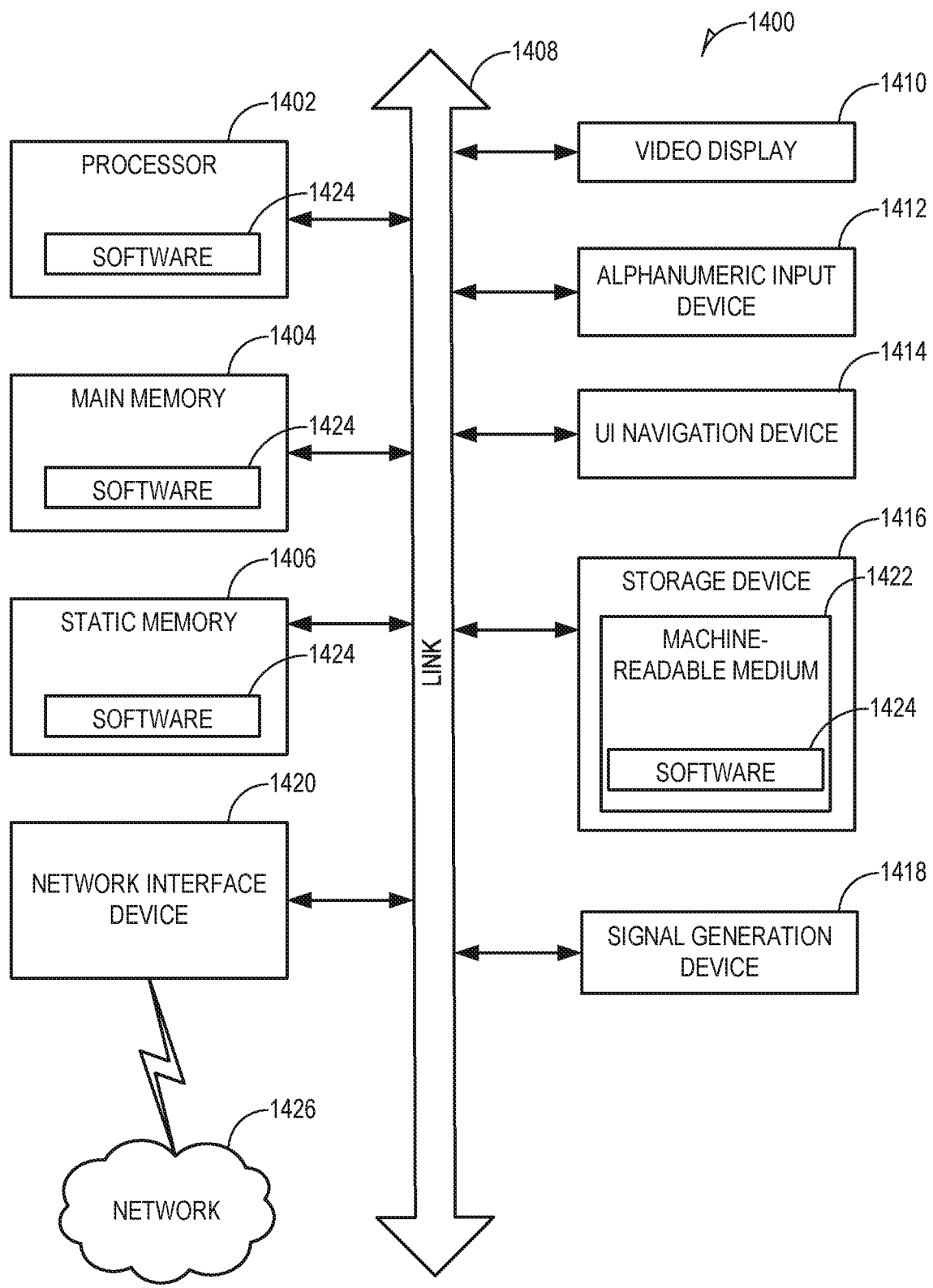
FIG. 14 is a block diagram illustrating an example machine upon which any one or more of the techniques (e.g., methodologies) discussed herein may be performed, according to an example embodiment.

FIG. 13 illustrates a flowchart of a method 1300, according to various examples. The operations depicted in the method may be performed by executing non-transitory machine-readable code on a processing device (e.g., a central processing unit (CPU), a core of a CPU, a graphical processing unit, an application specific integrated circuit, etc.). The method may be performed on a computing system such as illustrated in FIG. 14. Performance of the method by the processing device may include sending instructions or controlling other devices. For example, the processing device may cause a network device of a computing system to transit packetized data to another computing system or cause a change in a state of pixels on a display device.

Method 1300 includes operation 1302 to receive data from a computing device requesting approval of a loan application. The data may include an identification of one or more borrowers. The data may be received via an API provided by a server that receives the data. For example, the computing device may execute a web browser and navigate to a webpage that hosts the loan application. A user may enter data into the web page that is then transmitted to the server using the API.

In an example, at operation 1304, time-series data associated with the user is accessed from a knowledge graph. The knowledge graph may in turn be based on data stored in a relational database system translated into a triplestore database. To access the data, the server may use data included in the loan application as inputs (e.g., name, social security number) to query the knowledge graph. Stored snap shots of the knowledge graph may be used to retrieve multiple data values for the same type of data (e.g., a loan balance) to generate the time-series data.

More than one type of data may be retrieved from the knowledge graph. For example, the server may store a list of data types that is used to retrieve time-series data (e.g., time-series data for each type). The data types in the list may be determined based on previously conducted statistical analysis. For example, the top 200 inputs in terms of correlation to performance of a loan may be used. In some examples, all time-series data on object types in the knowledge graph are used are retrieved. The number of data points in a time-series (e.g, 10) and time between time points (e.g., daily, monthly, yearly) may be configurable at the server using a user interface presented to a system user.

In an example, at operation 1306, a feature vector may be built based on the accessed time-series data. Building a feature vector may include translation of semantic object types e.g., an RDF triple) into vector space. The order of features (e.g., data values) in a feature vector may match the input order in a machine learning model. Accordingly, using the retrieved data on operation 1304, the server may generate a concatenated string of values (e.g., [0.4, 0.2, 0.1 . . . ]).

In an example, at operation 1308, the feature vector may be inputted in a machine learning model. The machine learning model may be implemented as program code that accepts input via an API, file-browser, command-line interface, and the like. Accordingly, the server may call the machine learning model using the generated feature vector as an input variable, in an example. In an example, the machine learning model is a recurrent neural network.

The machine learning model may be configured in a variety of ways. For example, the machine learning model may be configured as a binary classifier having only a single output node, the node signifying the level of approval for the loan application. The machine learning model may be configured as having a plurality of output nodes indicating a respective plurality of reasons for rejecting the loan application, in some examples.

The values in the plurality of output nodes may be indicate the probability of various reasons for declining a loan application—one reason per output node. The reasons may be defined as a list of codes. Accordingly, a value of "0.5" for a node may mean there is a 50% chance a particular rejection code would apply to the loan applications. With respect to a binary classifier, the value of the output node may indicate the overall probability (e.g, the level of approval) that that loan application should be rejected.

Coefficients of the nodes in the machine learning model may be based on feature vectors that were in turn based on performance of loans of previously accepted loan applications and feature vectors based on inferred performance of previously denied loan applications.

In some examples in which a plurality of nodes is used, additionally operations may be performed. For example, a further operation may include accessing at least one value from the plurality of output nodes after inputting the feature vector into the machine learning model. A subset of the assessed value(s) may be selected based on a threshold (e.g., 80%). Then, if a value is below the threshold it may not be transmitted for verification.

Then, the at least value from the plurality of output nodes may be transmitted for verification. Transmitting may include routing the output of the accessed nodes to a display on the same device the machine learning model is executed or a separate verification computing system. A response may be received (e.g., over an API) in response. The response may indicate whether the at least one value is valid for the inputted feature vector. Valid may mean that the loan application may be rejected and may then be associated with the corresponding rejection code(s). The transmitted response in operation 1312 to the requested approval may further be based on the response to the verification.

The operations may further include training the machine learning model based on the response to the verification. For example, a labeled feature vector may be generated with the values corresponding to the validated rejection codes set to '1' and all other values set to '0.'

In some examples when the binary classifier is used, additional operations may be performed. For example, an operation may include requesting a reason for rejection of the loan application when the level of approval is below a threshold. Then, a labeled feature vector may be built based on the time-series data and a response to the request for the reasons for rejection. For example, a labeled feature vector may be generated with the values corresponding to the received rejection codes set to '1' and all other values set to '0.' A second machine learning model may be trained based on the built feature vector.

In an example, at operation 1310, a response from the output from the machine learning mode may be received. The response may indicate a level of approval for the user with respect to the loan application. As indicated above, the output may be a probability. Receipt of the output may be in a command line, an API response, a web page display, etc. In an example, the response may be received in response to a query to the machine learning model.

In an example, at operation 1312, a response to the request based on the level of approval may be transmitted. The response to the request may include data signifying a reason for rejection, if applicable. The response may be presented on a computing system of a user (e.g., the same computing system that transmitted the loan application).

Example Computer System

Embodiments described herein may be implemented in one or a combination of hardware, firmware, and software. Embodiments may also be implemented as instructions stored on a machine-readable storage device, which may be read and executed by at least one processor' to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g, a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

FIG. 14 is a block diagram illustrating a machine in the example form of a computer system 1400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deploy merit, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1400 includes at least one processor 1402 (e.g., a central processing unit (CPU), a graphics processing unit (GPU) or both, processor cores, compute nodes, etc.), a main memory 1404 and a static memory 1406, which communicate with each other via a link 1408 (e.g., bus). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touch screen display. The computer system 1400 may additionally include a storage device 1416 (e.g., a drive unit), a signal generation device 1418 (e.g., a speaker), a network interface device 1420, and one or more sensors (not shown), such as a global positioning system (GPS) sensor, compass, accelerometer, or other sensor.

The storage device 1416 includes a machine-readable medium 1422 on which is stored one or more sets of data structures and instructions 1424 (e.g, software) embodying or utilized by any one or more of the methodologies or functions described herein. The instructions 1424 may also reside, completely or at least partially, within the main memory 1404, static memory 1406, and/or within the processor 1402 during execution thereof by the computer system 1400, with the main memory 1404, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawing, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

The invention claimed is:

1. A method comprising:
receiving data from a computing device requesting approval of a loan application;
accessing time-series data associated with a user associated with the loan application from a knowledge graph, the time-series data including real description format (RDF) triples that identify account balances over a period of time;
building a multi-dimensional feature vector based on the RDF triples of the accessed time-series data; wherein building the multi-dimensional feature vector includes converting the RDF triples into a vector format, wherein a component of the multi-dimensional feature vector includes an account balance of the user of the RDF triples that identify account balances over a period of time;
inputting the multi-dimensional feature vector into a machine learning model, the machine learning model configured as a recurrent neural network having a plurality of output nodes indicating a respective plurality of reasons for rejecting the loan application;
receiving an output from the machine learning model in response to the inputting, the output indicating a level of approval for the user with respect to the loan application; and
transmitting a response to the request based on the level of approval.

2. The method of claim 1, further comprising:
accessing at least one value from the plurality of output nodes after inputting the feature vector into the machine learning model;
transmitting the at least one value from the plurality of output nodes for verification;
receiving a response to the verification, the response indicating whether the at least one value is valid for the inputted feature vector; and
wherein the transmitted response to the requested approval is further based on the response to the verification.

3. The method of claim 2, further comprising
training the machine learning model based on the response to the verification.

4. The method of claim 1, further comprising:
requesting a reason for rejection of the loan application when the level of approval is below a threshold;
building a labeled feature vector based on the time-series data and a response to the request for the reason for rejection; and
training a second machine learning model based on the labeled feature vector.

5. The method of claim 1, wherein coefficients of nodes in the machine learning model are based on:
feature vectors based on performance of loans of previously accepted loan applications; and
feature vectors based on inferred performance of previously denied loan applications.

6. The method of claim 1, wherein data in the knowledge graph is based on data stored in a relational database system translated into a triplestore database.

7. A non-transitory computer readable medium comprising instructions, which when executed by at least one processor, configure the at least one processor to perform operations comprising:
receiving data from a computing device requesting approval of a loan application;
accessing time-series data associated with a user associated with the loan application from a knowledge graph, the time-series data including real description format (RDF) triples that identify account balances over a period of time;

building a multi-dimensional feature vector based on the RDF triples of the accessed time-series data, wherein building the multi-dimensional feature vector includes converting the RDF triples into a vector format, wherein a component of the multi-dimensional feature vector includes an account balance of the user of the RDF triples that identify account balances over a period of time;

inputting the multi-dimensional feature vector into a machine learning model, the machine learning model configured as a recurrent neural network having a plurality of output nodes indicating a respective plurality of reasons for rejecting the loan application;

receiving an output from the machine learning model in response to the inputting, the output indicating a level of approval for the user with respect to the loan application; and transmitting a response to the request based on the level of approval.

8. The non-transitory computer readable medium of claim 7, the operations further comprising:

accessing at least one value from the plurality of output nodes after inputting the feature vector into the machine learning model;

transmitting the at least one value from the plurality of output nodes for verification;

receiving a response to the verification, the response indicating whether the at least one value is valid for the inputted feature vector; and wherein the transmitted response to the requested approval is further based on the response to the verification.

9. The non-transitory computer readable medium of claim 8, the operations further comprising training the machine learning model based on the response to the verification.

10. The non-transitory computer readable medium of claim 7, the operations further comprising:

requesting a reason for rejection of the loan application when the level of approval is below a threshold;

building a labeled feature vector based on the time-series data and a response to the request for the reason for rejection; and training a second machine learning model based on the labeled feature vector.

11. The non-transitory computer readable medium of claim 7, wherein coefficients of nodes in the machine learning model are based on:

feature vectors based on performance of loans of previously accepted loan applications; and feature vectors based on inferred performance of previously denied loan applications.

12. The non-transitory computer readable medium of claim 7, wherein data in the knowledge graph is based on data stored in a relational database system translated into a triplestore database.

13. A system comprising:

at least one processor; and a storage device comprising instructions, which when executed by the at least one processor, configure at the at least one processor to:

receive data from a computing device requesting approval of a loan application;

access time-series data associated with a user associated with the loan application from a knowledge graph, the time-series data including real description format (RDF) triples that identify account balances over a period of time;

build a multi-dimensional feature vector based on the RDF triples of the accessed time-series data, wherein building the multi-dimensional feature vector includes converting the RDF triples into a vector format, wherein a component of the multi-dimensional feature vector includes an account balance of the user of the RDF triples that identify account balances over a period of time;

input the multi-dimensional feature vector into a machine learning model, the machine learning model configured as a recurrent neural network having a plurality of output nodes indicating a respective plurality of reasons for rejecting the loan application;

receive an output from the machine learning model in response to the inputting, the output indicating a level of approval for the user with respect to the loan application; and transmit a response to the request based on the level of approval.

14. The system of claim 13, wherein the at least one processor is further configured, when executing the instructions, to:

access at least one value from the plurality of output nodes after inputting the feature vector into the machine learning model;

transmit the at least one value from the plurality of output nodes for verification;

receive a response to the verification, the response indicating whether the at least one value is valid for the inputted feature vector; and wherein the transmitted response to the requested approval is further based on the response to the verification.

15. The system of claim 14, wherein the at least one processor is further configured, when executing the instructions, to:

train the machine learning model based on the response to the verification.

16. The system of claim 13, wherein the at least one processor is further configured, when executing the instructions, to:

request a reason for rejection of the loan application when the level of approval is below a threshold;

build a labeled feature vector based on the time-series data and a response to the request for the reason for rejection; and training a second machine learning model based on the labeled feature vector.

17. The system of claim 13, wherein coefficients of nodes in the machine learning model are based on:

feature vectors based on performance of loans of previously accepted loan applications; and feature vectors based on inferred performance of previously denied loan applications.

18. The system of claim 13, wherein data in the knowledge graph is based on data stored in a relational database system translated into a triplestore database.

* * * * *